(12) United States Patent
Liu et al.

(10) Patent No.: US 11,391,892 B2
(45) Date of Patent: Jul. 19, 2022

(54) OPTICAL COUPLING APPARATUS, METHOD FOR PACKAGING OPTICAL COUPLING APPARATUS, OPTICAL MODULE, AND COMMUNICATIONS DEVICE

(71) Applicant: HUAWEI TECHNOLOGIES CO., LTD., Shenzhen (CN)

(72) Inventors: Jun Liu, Dongguan (CN); Zhen Dong, Dongguan (CN); Lei Gao, Dongguan (CN); Xiaolu Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/146,365

(22) Filed: Jan. 11, 2021

(65) Prior Publication Data

US 2021/0132304 A1    May 6, 2021

Related U.S. Application Data

(63) Continuation of application No. PCT/CN2018/095511, filed on Jul. 12, 2018.

(51) Int. Cl.
*G02B 6/30* (2006.01)
*G02B 6/42* (2006.01)

(52) U.S. Cl.
CPC .............. *G02B 6/30* (2013.01); *G02B 6/4202* (2013.01); *G02B 6/423* (2013.01)

(58) Field of Classification Search
None
See application file for complete search history.

(56) References Cited

U.S. PATENT DOCUMENTS 5,280,550 A * 1/1994 Parriaux .............. G02B 6/4202
385/14
5,309,537 A * 5/1994 Chun ................... G02B 6/1221
385/126

(Continued)

FOREIGN PATENT DOCUMENTS

CN         1115857 A     1/1996
CN       102590950 A     7/2012

(Continued)

OTHER PUBLICATIONS

Office Action issued in CN201880095175.1 dated Jun. 2, 2021, 10 pages.

(Continued)

*Primary Examiner* — Michael Stahl (57) ABSTRACT

Embodiments provide an optical coupling apparatus, an optical module, and a communications device. In those embodiments, the optical coupling apparatus includes: an optical fiber component, including a plurality of optical fibers and an optical fiber fixing block. The plurality of optical fibers are fixed to the optical fiber fixing block. A first end face is disposed on the optical fiber fixing block. At least some of the optical fibers include plug ends which protrude from the first end face. An optical write waveguide block, including a main body and a plurality of waveguides disposed in the main body. A second end face is disposed on the main body, coupling holes that are in a one-to-one correspondence with the plug ends are disposed on the second end face in a recessed manner, and the coupling holes are formed when ends of the waveguides are recessed from the second end face.

20 Claims, 6 Drawing Sheets

(56) References Cited

U.S. PATENT DOCUMENTS

| | | | | |
|---|---|---|---|---|
| 5,481,632 | A | * | 1/1996 | Hirai ............. G02B 6/30 385/49 |
| 6,238,100 | B1 | | 5/2001 | Sasaki et al. |
| 6,672,773 | B1 | * | 1/2004 | Glenn ............. G02B 6/30 385/70 |
| 2001/0019648 | A1 | | 9/2001 | Nobuhara |
| 2004/0218874 | A1 | | 11/2004 | Kondo |
| 2009/0214157 | A1 | | 8/2009 | Okubo et al. |
| 2013/0251304 | A1 | | 9/2013 | Barwicz et al. |
| 2015/0063755 | A1 | * | 3/2015 | Doany ............. G02B 6/425 385/59 |

FOREIGN PATENT DOCUMENTS

| | | | |
|---|---|---|---|
| CN | 103984063 | A | 8/2014 |
| CN | 106950652 | A | 7/2017 |
| CN | 107407782 | A | 11/2017 |
| CN | 107533201 | A | 1/2018 |
| CN | 108027478 | A | 5/2018 |
| CN | 108885313 | A | 11/2018 |
| JP | 5-173038 | A * | 7/1993 |
| JP | H05173038 | A | 7/1993 |
| JP | 6-289255 | A * | 10/1994 |
| JP | H06289255 | A | 10/1994 |
| JP | 8-201651 | A * | 8/1996 |
| JP | H08201651 | A | 8/1996 |
| JP | 2004205662 | A | 7/2004 |
| WO | 2016197332 | A1 | 12/2016 |

OTHER PUBLICATIONS

Extended European Search Report issued in EP 18925780.1, dated Jun. 7, 2021, 8 pages.

International Search Report and Written Opinion issued in PCT/CN2018/095511, dated Apr. 3, 2019, 10 pages.

Office Action dated May 12, 2022 issued for Chinese Application No. 201880095175.1 (9 pages).

* cited by examiner

OPTICAL COUPLING APPARATUS, METHOD FOR PACKAGING OPTICAL COUPLING APPARATUS, OPTICAL MODULE, AND COMMUNICATIONS DEVICE

CROSS-REFERENCE TO RELATED APPLICATIONS

This application is a continuation of International Application No. PCT/CN2018/095511, filed on Jul. 12, 2018, the disclosure of which is hereby incorporated by reference in its entirety.

TECHNICAL FIELD

Embodiments relate to the field of optical communications technologies, and in particular, to an optical coupling apparatus, an optical module, and a communications device.

BACKGROUND

Ever-increasing data demands impose a higher requirement on a capacity and a bandwidth that are of a transport network. High-speed and large-capacity communications devices being interconnected becomes a basis for building a high-speed and large-capacity transport network. An optical module is an important part of a data transport network. The optical module mainly performs low-loss and long-distance transmission by using an optical fiber. An optical signal is transmitted between an optical fiber and an optical chip, and optical-electro signal conversion and electro-optical signal conversion are implemented by using the optical chip. Coupling needs to be performed between the optical fiber and the optical chip for the optical signal. However, large-capacity data optical-interconnection requires a plurality of channels and a high optical fiber channel density, and the high channel density results in comparatively high difficulty in coupling and alignment during coupling and packaging. As a result, coupling efficiency is affected.

SUMMARY

Embodiments provide a high-density multi-channel optical coupling apparatus, an optical module, and a communications device, so as to reduce difficulty in coupling and alignment.

According to a first aspect, an optical coupling apparatus in this application includes: an optical fiber component, including a plurality of optical fibers and an optical fiber fixing block, where the plurality of optical fibers are fixed to the optical fiber fixing block, a first end face is disposed on the optical fiber fixing block, at least some of the optical fibers include plug ends, and the plug ends protrude from the first end face; and an optical write waveguide block, including a main body and a plurality of waveguides corresponding to fiber cores of the plurality of optical fibers, where the plurality of waveguides are disposed in the main body, a second end face is disposed on the main body, coupling holes that are in a one-to-one correspondence with the plug ends are disposed on the second end face in a recessed manner, and the coupling holes are formed when ends of the waveguides are recessed from the second end face; and when the second end face and the first end face are connected to each other, the plug ends of the at least some of the optical fibers are inserted into the coupling holes in a one-to-one correspondence manner, so that the fiber cores of the plurality of optical fibers are coupled to and aligned with the plurality of waveguides in a one-to-one correspondence manner, thereby implementing optical signal transmission between the optical fiber component and the optical write waveguide block. Locations and quantities of the plug ends and locations and quantities of the coupling holes may be flexibly selected based on a requirement. In this embodiment of this application, ends of the optical fibers are directly used as the plug ends to be plugged into the coupling holes that are in the optical write waveguide block and that are connected to the waveguides, featuring a simple structure and comparatively low costs, and preventing a loss caused by use of an additional coupling apparatus. In addition, plugging the plug ends into the coupling holes assists in coupling and alignment between the optical fiber component and the optical write waveguide block, thereby reducing difficulty in coupling and alignment between high-density optical fibers and waveguides, improving efficiency in packaging the optical fiber component and the optical write waveguide block, and further improving coupling precision.

In some embodiments, an aperture of an end that is of the coupling hole and that is located on the second end face is greater than an aperture of an end that is of the coupling hole and that is connected to the waveguide. In other words, the coupling hole is similar to a horn shape. This makes inserting the plug end into the coupling hole easier when the optical fiber component and the optical write waveguide block are connected to each other. Further, a length that is of the plug end and that protrudes from the first end face is less than 1 millimeter, to ensure that an optical fiber disposed with a plug end has sufficient strength and collimation, thereby implementing high-precision auxiliary coupling and alignment.

In some embodiments, a mode field diameter of a side that is of the waveguide in the optical write waveguide block and that is configured to be coupled to the optical fiber is equal to a mode field diameter of the optical fiber. This facilitates coupling and alignment between the optical fiber component and the optical write waveguide block, improves coupling efficiency, and reduces a coupling loss.

In some embodiments, the some optical fibers that are in the plurality of optical fibers and that include the plug ends are first optical fibers, other optical fibers in the plurality of optical fibers are second optical fibers, and the first optical fibers are distributed on a periphery of the second optical fibers, or the first optical fibers are distributed among the second optical fibers, or the first optical fibers are distributed on two opposite sides of the second optical fibers. In this embodiment, the first optical fibers are distributed relative to distribution of the second optical fibers, thereby improving robustness and convenience of plugging between the optical fiber component and the optical write waveguide block.

In some embodiments, ends of optical fibers in the plurality of optical fibers other than the optical fibers disposed with the plug ends are flush with the first end face, and ends of waveguides in the plurality of waveguides other than waveguides disposed with a coupling hole are flush with the second end face. After the plug ends are plugged into the coupling holes, packages of the first end face and the second end face are close and fit to each other, and the ends of the optical fibers other than the optical fibers disposed with the plug ends and the ends of the waveguides other than the waveguides disposed with a coupling hole can be as close as possible, thereby reducing a loss of optical transmission.

In some embodiments, the plurality of optical fibers are single-core optical fibers, multi-core optical fibers, or a combination of single-core optical fibers and multi-core optical fibers. The plug ends can be aligned with the coupling holes provided that the optical fiber component is coupled to and packaged with the optical write waveguide block.

In some embodiments, the plurality of optical fibers are arranged in a two-dimensional array in the optical fiber fixing block. This can meet a requirement of high-density multi-channel coupling.

In some embodiments, a quantity of waveguides forming one coupling hole is the same as a quantity of fiber cores of the optical fiber inserted into the coupling hole, to implement insertion between the coupling hole and a single-core optical fiber or a multi-core optical fiber. When the optical fiber is a multi-core optical fiber, the quantity of waveguides connected in the coupling hole is the same as the quantity of fiber cores, thereby implementing precise coupling between fiber cores of each optical fiber and waveguides.

In some embodiments, the optical fiber component and the optical write waveguide block are fixed through bonding between the second end face and the first end face. Quick alignment is implemented by plugging the plug ends into the coupling holes, with no need to implement alignment in another coupling manner, thereby improving packaging convenience and reducing costs. In addition, it does not occur that the optical fiber component and the optical write waveguide block shift due to an unstable bonding process resulting from glue or a process, and coupling precision is not affected.

According to a second aspect, an embodiment provides an optical module. The optical module includes an optical chip and the foregoing optical coupling apparatus, the main body of the optical write waveguide block includes a coupling face, the coupling face is disposed opposite to ends that are of the waveguides and that are located on the second end face, and the coupling face bonds with the optical chip to implement coupling between the optical chip and the optical write waveguide block. The optical chip in the optical module is quickly coupled to and packaged with the optical fiber component through the optical write waveguide block, thereby reducing difficulty in packaging and improving competitiveness under a premise of implementing high density and a plurality of channels. In addition, no other auxiliary coupling apparatus is required, thereby reducing packaging costs and an optical loss.

In some embodiments, a mode field diameter of a side that is of the waveguide in the optical write waveguide block and that is configured to be coupled to the optical chip is equal to an out-light mode field diameter of the optical chip.

In some embodiments, the optical chip and the optical write waveguide block are coupled in one or more of the following manners: edge coupling, evanescent wave coupling, grating coupling, laser coupling, and sounding array coupling.

In some embodiments, ends that are of the plurality of waveguides in the optical write waveguide block and that are located on the coupling face are arranged in a linear or two-dimensional manner, and a diameter of the waveguide decreases gradually in a direction from the second end face to the coupling face, to implement mode field matching, thereby reducing an optical loss.

According to a third aspect, an embodiment of this application provides a communications device, including a circuit board and the optical module according to the second aspect, where the optical chip and the optical write waveguide block are disposed on the circuit board. The communications device may be a router, an optical backplane, a cabinet, or the like.

According to a fourth aspect, this application further provides a method for producing an optical coupling apparatus, where the optical coupling apparatus includes an optical fiber fixing block, a plurality of optical fibers, and a glass block, and the method includes:

fixing the plurality of optical fibers in the optical fiber fixing block, and making ends of some of the plurality of optical fibers protrude from a first end face of the optical fiber fixing block to form plug ends, so as to form an optical fiber component;

etching, in a direction from a coupling face to a second end face in the glass block by using a laser, waveguides that are in a one-to-one correspondence with fiber cores of the plurality of optical fibers, and producing, on ends of some of the waveguides, coupling holes that are recessed from the second end face and that are in a one-to-one correspondence with the plug ends, to form an optical write waveguide block, where the second end face and the coupling face are disposed opposite to each other, and the coupling face is configured to be coupled to an optical chip; and connecting the second end face of the optical write waveguide block to the first end face of the optical fiber component, where the plug ends are inserted into the coupling holes in a one-to-one correspondence manner.

In some embodiments, the step of etching, in a direction from a coupling face to a second end face in the glass block by using a laser, waveguides that are in a one-to-one correspondence with fiber cores of the plurality of optical fibers, and producing, on ends of some of the waveguides, coupling holes that are recessed from the second end face and that are in a one-to-one correspondence with the plug ends includes: presetting, in the glass block, a marking face that is opposite to the second end face and that is at a distance from the second end face, where an area between the marking face and the second end face is a positioning area, and after etching, by using a laser, the some of the waveguides to a location of the marking face, adjusting a laser parameter used for etching the some of the waveguides, and then continuing to etch the positioning area, so that the positioning area has an etching rate different from an etching rate at locations of the waveguides; and immersing the etched glass block in an acid solution, where glass in the immersed positioning area is corroded away to form a coupling hole recessed from the second end face. In the method for producing an optical coupling apparatus, ends of the optical fibers are directly used as the plug ends, and the coupling holes are formed in the glass block when the waveguides are formed. The production is simple, thereby greatly simplifying a production process and reducing costs. In addition, the optical fiber component and the optical write waveguide block can be coupled when the plug ends are plugged into the coupling holes, thereby improving coupling precision, and avoiding shifting of the optical fiber component and the optical write waveguide block during subsequent packaging due to unstable bonding resulting from glue or a process.

In the optical coupling apparatus in the embodiments of this application, plugging the plug ends into the coupling holes assists in coupling and alignment between the optical fiber component and the optical write waveguide block, thereby reducing difficulty in coupling and alignment between high-density optical fibers and waveguides, and improving efficiency in packaging the optical fiber component and the optical write waveguide block.

DESCRIPTION OF EMBODIMENTS

The following describes the technical solutions in the embodiments in accordance with reference to the accompanying drawings in the embodiments of this application.

Figure 1:
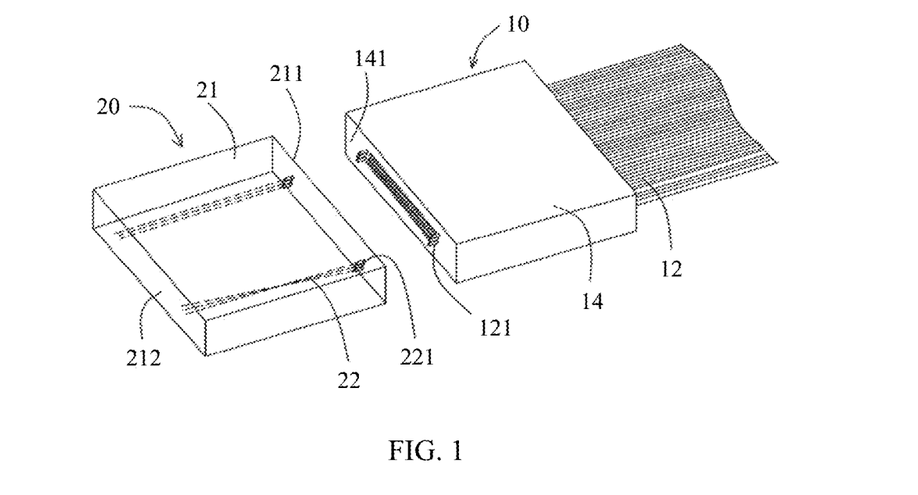
FIG. 1 is a schematic structural diagram of an optical coupling apparatus according to an embodiment of this application.

FIG. 1 shows an optical coupling apparatus according to an embodiment. The optical coupling apparatus is configured for packaging and coupling of an optical module in an optical interconnection network. The apparatus includes: an optical fiber component 10, including a plurality of optical fibers 12 and an optical fiber fixing block 14, where the plurality of optical fibers 12 are fixed to the optical fiber fixing block 14, a first end face 141 is disposed on the optical fiber fixing block 14, at least some of the optical fibers 12 include plug ends 121, and the plug ends 121 protrude from the first end face 141; and an optical write waveguide block 20, including a main body 21 and a plurality of waveguides 22 corresponding to fiber cores of the plurality of optical fibers 12, where the plurality of waveguides 22 are disposed in the main body 21, a second end face 211 is disposed on the main body 21, coupling holes 221 that are in a one-to-one correspondence with the plug ends 121 are disposed on the second end face 211 in a recessed manner, and the coupling holes 221 are formed when ends of the waveguides 22 are recessed from the second end face 211. The waveguides 22 shown in FIG. 1 are merely an example, and a size and paths that are of the waveguides 22 are not limited.

Figure 2:
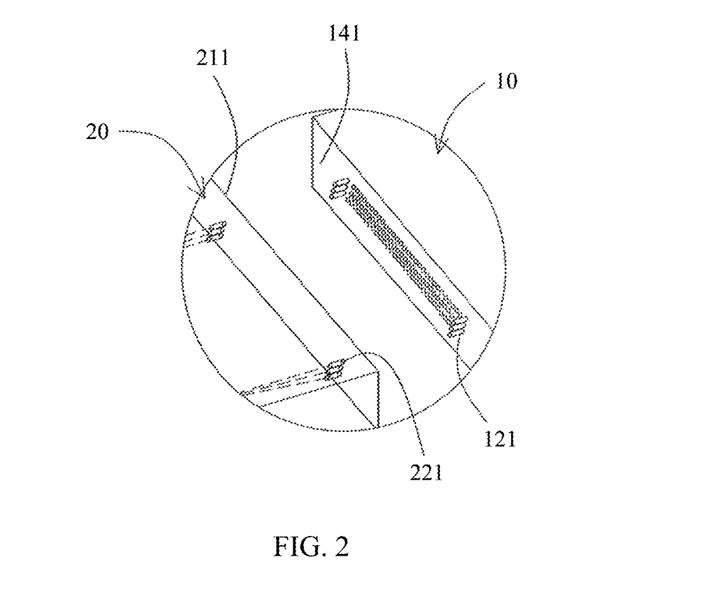
FIG. 2 is an enlarged schematic diagram of a partial structure of the optical coupling apparatus shown in FIG. 1.

FIG. 2 is an enlarged schematic diagram of a partial structure of the optical coupling apparatus shown in FIG. 1. When the second end face 211 and the first end face 141 are connected to each other, the plug ends 121 of the at least some of the optical fibers 12 are inserted into the coupling holes 221 in a one-to-one correspondence manner, thereby implementing optical signal transmission between the optical fiber component 10 and the optical write waveguide block 20. Locations and quantities of the plug ends 121 and locations and quantities of the coupling holes 221 may be flexibly selected based on a requirement.

For example, the optical fiber fixing block 14 is a block structure, and holes (not shown in the figure) penetrating the first end face 141 of the optical fiber fixing block 14 and an end face opposite to the first end face 141 are disposed in the optical fiber fixing block 14. One optical fiber 12 is inserted into each hole. Ends of the some optical fibers 12 extend from the first end face 141 to form the plug ends 121. The plug end 121 includes a fiber core and cladding wrapping the fiber core. Further, a length that is of the plug end 121 and that protrudes from a surface of the first end face 141 is less than 1 millimeter, thereby ensuring strength and collimation of the plug end 121 while ensuring accurate plugging between the plug end 121 and the coupling hole 221. In another embodiment, the optical fiber fixing block 14 includes two blocks disposed with grooves. When the two blocks are engaged, the grooves are engaged to each other to fasten the optical fibers 12. In this way, it is more convenient to install optical fibers.

The main body 21 of the optical write waveguide block 20 may be a glass block. The plurality of waveguides 22 are disposed in the main body 21, and the ends of the waveguides 22 are located on the second end face 211 of the main body 21. An arrangement of the waveguides 22 corresponds to an arrangement of the plurality of optical fibers 12. The coupling holes 221 are formed when the ends that are of the waveguides 22 and that are located on the second end face 211 are recessed into the main body 21. A diameter of the coupling hole 221 is just enough for insertion and fastening of the plug end 121. After the plug ends 121 are inserted into the coupling holes 221, the optical fibers 12 disposed with the plug ends 121 are directly aligned with the waveguides 22 in the coupling holes 221, and other optical fibers 12 are directly coupled to and aligned with waveguides 22 in a one-to-one manner.

Further, the plurality of optical fibers 12 are single-core optical fibers, multi-core optical fibers, or a combination of single-core optical fibers 12 and multi-core optical fibers. The plug ends 121 can be aligned with the coupling holes 221 provided that the optical fiber component 10 is coupled to and packaged with the optical write waveguide block 20. A quantity of waveguides 22 forming one coupling hole 221 is the same as a quantity of fiber cores of the optical fiber 12 inserted into the coupling hole 221, that is, meeting that one fiber core corresponds to one waveguide 22, to implement that the coupling hole 221 adapts to insertion of a single-core optical fiber or a multi-core optical fiber, and ensure precise coupling between a fiber core of each optical fiber 12 and the waveguide 22.

Figure 3:
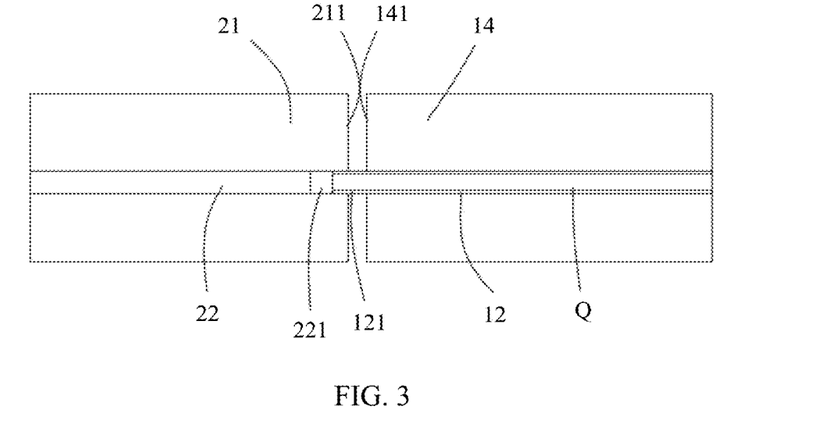
FIG. 3 is a schematic diagram of a plugging state of an optical fiber component and an optical write waveguide block in the optical coupling apparatus shown in FIG. 1, and the figure shows only a plugging state of one optical fiber and one waveguide.
Figure 4:
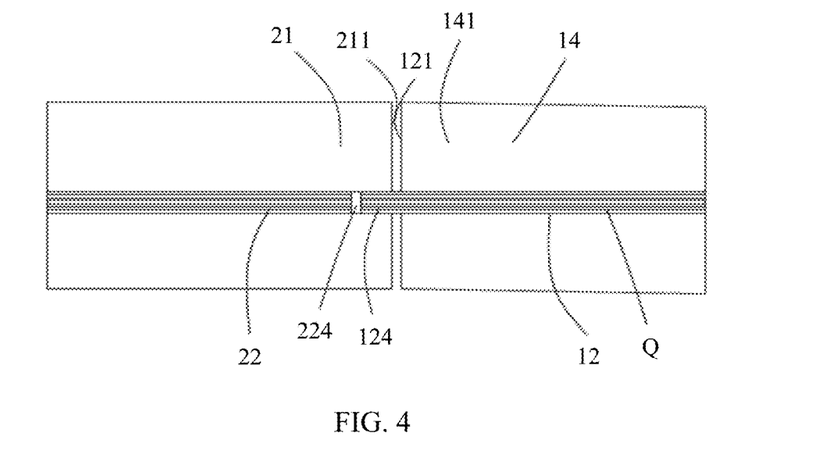
FIG. 4 is a schematic diagram of a plugging state of an optical fiber and a waveguide when the optical fiber component shown in FIG. 1 uses multi-core optical fibers.

In this embodiment, FIG. 3 is a schematic diagram of one optical fiber 12 in the optical fiber component 10 inserting into one coupling hole 221 in the optical write waveguide block 20. The plurality of optical fibers 12 are single-core optical fibers, each optical fiber has only one fiber core Q, and a coupling hole 221 corresponding to the fiber core Q corresponds to only one waveguide 22. Still further, with reference to FIG. 2, the plurality of optical fibers 12 are arranged in a two-dimensional array in the optical fiber fixing block 14, thereby implementing a high-density multi-channel configuration by producing an optical fiber array by using ordinary single-core optical fibers, and reducing a coupling loss and costs. A dimensional tolerance of a hole center distance between two holes of a plurality of coupling holes 221 corresponding to the plurality of plug ends 121 is controlled to be within 0.3 um to 0.5 um, so that the optical fiber component 10 can meet a requirement of high-density multi-channel coupling and packaging. In another implementation, FIG. 4 is a schematic diagram of a case in which the optical fiber component 10 uses multi-core optical fibers. Each optical fiber 12 includes a plurality of fiber cores Q. Likewise, a plug end 124 may be disposed at an end of the optical fiber 12. A coupling hole 224 corresponding to the plug end 124 is connected to waveguides 22 whose quantity is the same as a quantity of fiber cores in the multi-core optical fiber. The optical fiber component 10 uses multi-core optical fibers, and the multi-core optical fibers 12 may be fixed in the optical fiber fixing block 14 in a one-dimensional arrangement manner or in a two-dimensional array.

Figure 5:
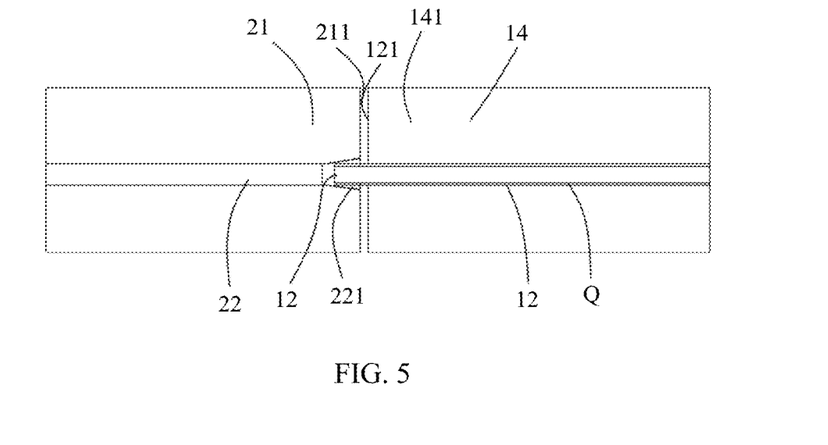
FIG. 5 is a schematic diagram of another implementation of the coupling hole shown in FIG. 3.

FIG. 5 shows another implementation of a coupling hole. This embodiment differs from the foregoing embodiment in that an aperture of an end that is of the coupling hole 221 and that is located on the second end face 211 is greater than an aperture of an end that is of the coupling hole 221 and that is connected to the waveguide 22. This makes it easier for the plug end 121 to find a correct coupling hole from the second end face 211 and insert into the coupling hole 221 when the optical fiber component 10 and the optical write waveguide block 20 are connected to each other, provided that a specific diameter size of the coupling hole 221 can fix the plug end 121 and prevent the plug end 121 from shifting. The coupling hole 221 in this embodiment is similar to a horn hole. In another implementation, the plug end 121 of the optical fiber 12 may be made into a conical shape for the coupling hole 221. This makes plugging into the coupling hole 221 easier.

Further, a mode field diameter of a side that is of the waveguide 22 in the optical write waveguide block 20 and that is configured to be coupled to the optical fiber 12 is equal to a mode field diameter of the optical fiber 12. This facilitates coupling and alignment between the optical fiber component 10 and the optical write waveguide block 20, with no need to introduce a mode field adjustment component or perform rotation to adjust coupling, improves coupling efficiency, and reduces a coupling loss.

Figure 6:
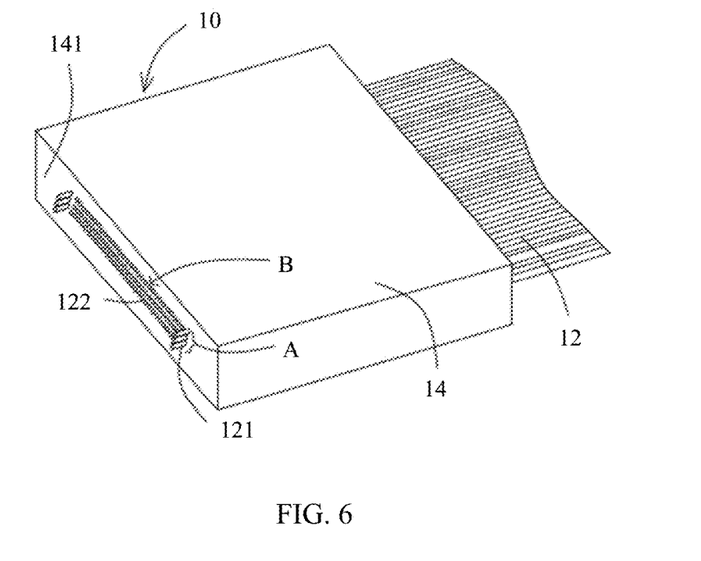
FIG. 6 is a schematic structural diagram of the optical fiber component shown in FIG. 1, where plug ends are located on two opposite sides of ends of other optical fibers.

Further, FIG. 6 is a schematic structural diagram of the optical fiber component shown in FIG. 1. Ends 122 of optical fibers 12 in the plurality of optical fibers 12 other than the optical fibers 12 disposed with the plug ends 121 are flush with the first end face 141. Correspondingly, ends (not shown in the figure) of waveguides in the plurality of waveguides 22 other than waveguides 22 disposed with a coupling hole 221 are flush with the second end face 211. After the plug ends 121 are plugged into the coupling holes 221, packages of the first end face 141 and the second end face 211 are close and fit to each other, and the ends 122 of the optical fibers 12 not disposed with a plug end and the ends of the waveguides 22 not disposed with a coupling hole 221 may be coupled as close as possible, thereby reducing a loss of optical transmission.

Figure 7:
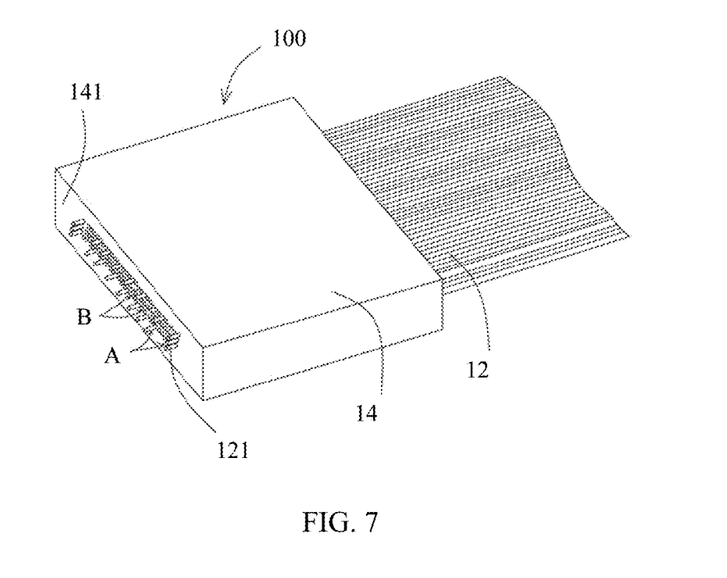
FIG. 7 is a schematic diagram of an implementation of the optical fiber component shown in FIG. 6.
Figure 8:
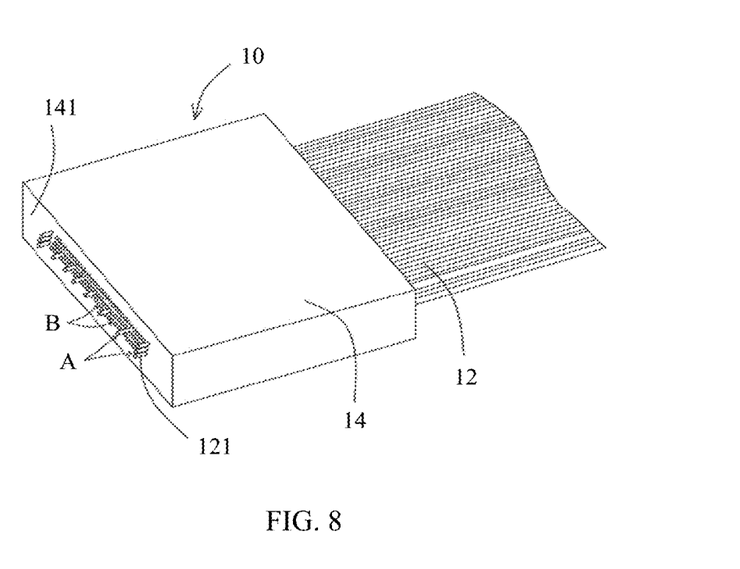
FIG. 8 is a schematic diagram of another implementation of the optical fiber component shown in FIG. 6.

Referring to FIG. 6, in this embodiment, the some optical fibers that are in the plurality of optical fibers 12 and that include the plug ends 121 are first optical fibers A, and other optical fibers in the plurality of optical fibers 12 are second optical fibers B. In this embodiment, the first optical fibers A including the plug ends 121 are distributed on two opposite sides of the second optical fibers B, so that the optical fiber fixing block 14 remains balanced after the plug ends 121 are inserted into the coupling holes 221, thereby improving robustness and convenience of plugging between the optical fiber component 10 and the optical write waveguide block 20. Certainly, the first optical fibers A may be distributed on the first end surface 141 in a three-point manner, ensuring more robust plugging. FIG. 7 shows an implementation of plug ends 121 and ends of other optical fibers of the optical fiber component 10. The first optical fibers A are distributed on a periphery of the second optical fibers B. Alternatively, FIG. 8 shows another implementation of plug ends 121 and ends of other optical fibers of the optical fiber component 10. The first optical fibers A including the plug ends 121 are distributed among the second optical fibers B. In another implementation, all the optical fibers 12 may be disposed with the plug ends 121, all the corresponding waveguides 22 may be disposed with a coupling hole, and each optical fiber is inserted into a coupling hole. Certainly, the plug ends 121 may be of different lengths, and corresponding coupling holes 221 are also changed accordingly.

In this embodiment, the optical fiber component 10 and the optical write waveguide block 20 are fixed through bonding between the second end face 211 and the first end face 141. Quick alignment is implemented by plugging the plug ends 121 into the coupling holes 221, with no need to implement alignment in another coupling manner, thereby improving packaging convenience and reducing costs. In addition, it does not occur that the optical fiber component 10 and the optical write waveguide block 20 shift due to an unstable bonding process resulting from glue or a process, thereby avoiding that coupling precision is affected.

In this application, plugging the plug ends 121 into the coupling holes 221 assists in coupling and alignment between the optical fiber component 10 and the optical write waveguide block 20, thereby reducing difficulty in coupling and alignment between optical fibers and waveguides, and improving coupling precision while meeting a requirement of high-density multi-channel coupling and packaging. In addition, the ends of the optical fibers 12 are directly used as the plug ends 121 to be plugged into the coupling holes 221 that are in the optical write waveguide block 20 and that are connected to the waveguides 22. This can reduce a coupling loss, and features a simple structure and comparatively low costs.

Figure 9:
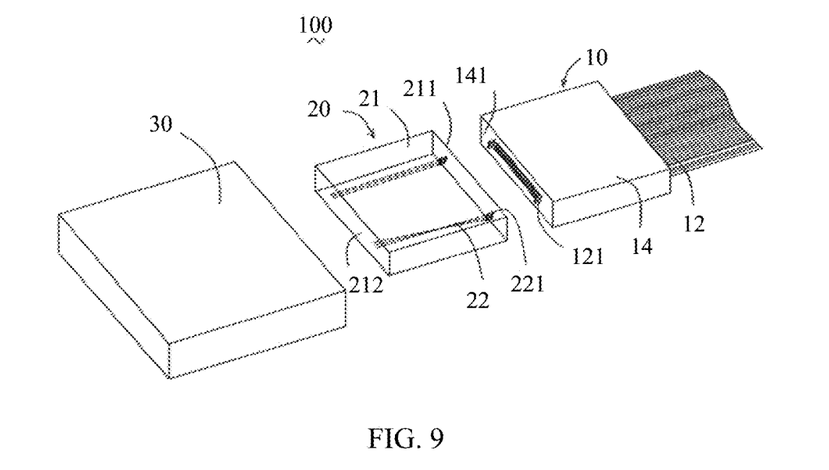
FIG. 9 is a schematic diagram of an optical module according to an embodiment of this application.

FIG. 9 shows an optical module according to an embodiment of this application. The optical module 100 includes an optical chip 30 and the foregoing optical coupling apparatus, the main body 21 of the optical write waveguide block 20 includes a coupling face 212, the coupling face 212 is disposed opposite to ends that are of the waveguides 22 and that are located on the second end face 211, and the coupling face 212 bonds with the optical chip 30 to implement coupling between the optical chip 30 and the optical write waveguide block 20. The optical chip 30 in the optical module 100 is quickly coupled to and packaged with the optical fiber component 10 through the optical write waveguide block 20, thereby reducing difficulty in packaging and improving competitiveness under a premise of implementing high density and a plurality of channels. In addition, no other auxiliary coupling apparatus is required, thereby reducing packaging costs and an optical loss.

Figure 10:
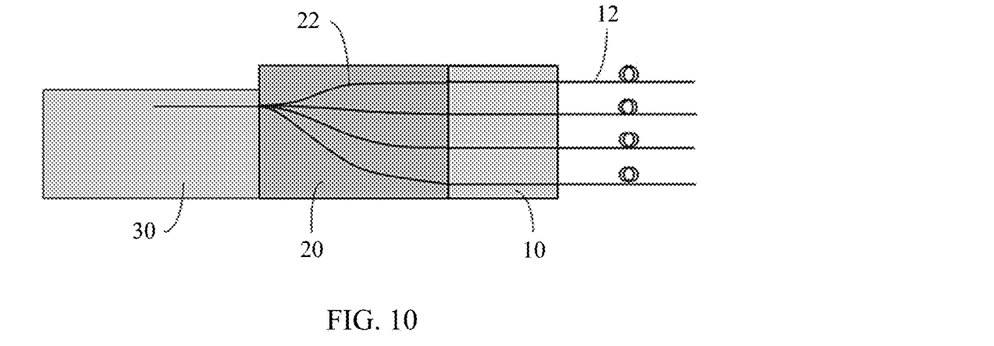
FIG. 10 is a schematic diagram of an internal plane obtained after an optical chip and an optical fiber component are coupled to and packaged with an optical write waveguide block in the optical module shown in FIG. 9.

In this embodiment, a mode field diameter of a side that is of the waveguide 22 in the optical write waveguide block 20 and that is configured to be coupled to the optical chip is equal to an out-light mode field diameter of the optical chip. This facilitates coupling between the optical chip 30 and the optical write waveguide block 20, improves coupling efficiency, and reduces a coupling loss. The optical chip 30 and the optical write waveguide block 20 are coupled in one or more of the following manners: edge coupling, evanescent wave coupling, grating coupling, laser coupling, and sounding array coupling. It should be noted that an end that is of the waveguide 22 and that is coupled to the optical chip 30 is located on the coupling face 212. Disposing of the coupling face 212 can implement that the optical write waveguide block 20 is coupled to the optical chip 30 in any one of the foregoing coupling manners through the coupling face. As shown in FIG. 10, in this embodiment, the optical chip 30 is coupled to the optical write waveguide block 20 in the edge coupling manner.

Ends that are of the plurality of waveguides 22 in the optical write waveguide block 20 and that are located on the coupling face 212 are arranged in a linear or two-dimensional manner, and a diameter of the waveguide 22 decreases gradually in a direction from the second end face 211 to the coupling face 212, to match an effective receive area of the optical chip 30 and implement mode field matching, thereby reducing an optical loss. Further, there is no need to dispose another apparatus between the optical write waveguide block 20 and the optical chip 30 to reconcile mode field matching.

Figure 11:
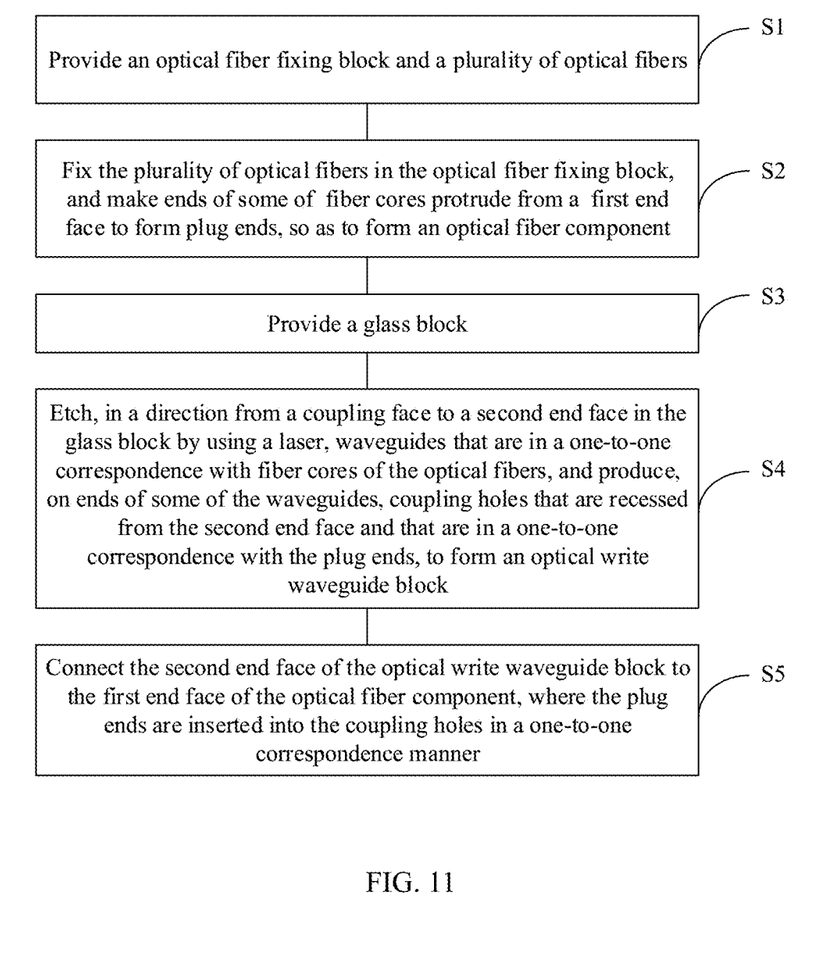
FIG. 11 is a flowchart of a method for producing an optical coupling apparatus according to an embodiment of this application.

FIG. 11 shows a method for producing an optical coupling apparatus according to an embodiment of this application. The method may be applied to the described embodiments of the optical coupling apparatus, as shown in FIG. 1 to FIG. 8. The optical coupling apparatus includes the optical fiber fixing block 14, the plurality of optical fibers 12, and a glass block, that is, the main body 21, and the main body 21 includes the coupling face 212. The method includes the following steps.

Step S1: Fix the plurality of optical fibers 12 in the optical fiber fixing block 14, and make ends of fiber cores of some of the optical fibers 12 protrude from the first end face 141 of the optical fiber fixing block 14 to form plug ends 121, so as to form the optical fiber component 10, where the optical fiber fixing block 14 may be formed when two blocks with a plurality of grooves are connected to each other, the grooves of the two blocks are engaged to form holes used for fastening optical fibers, and a cross section of the groove may be V-shaped, so as to fasten an optical fiber in a better way.

Step S2: Etch, in a direction from the coupling face 212 to the second end face 211 in the glass block 21 by using a laser, the waveguides 22 that are in a one-to-one correspondence with fiber cores of the optical fibers 12, and produce, on ends of some of the waveguides 22, the coupling holes 221 that are recessed from the second end face 211 and that are in a one-to-one correspondence with the plug ends 121, to form the optical write waveguide block 20, where the second end face 211 is disposed away from the coupling face 212, and the coupling face 212 is configured to be coupled to and packaged with the optical chip 30 that is coupled to the optical write waveguide block 20.

Figure 12:
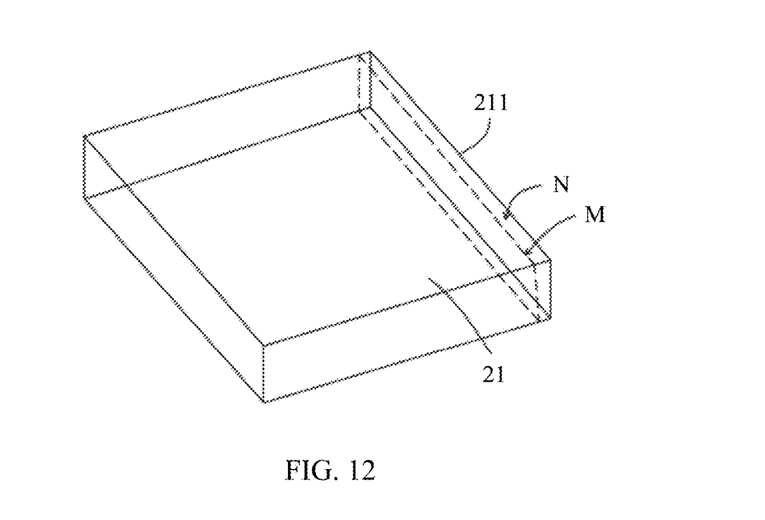
FIG. 12 is a diagram of a production state of an optical write waveguide block in the method for producing an optical coupling apparatus shown in FIG. 11.

For example, this step is as follows: Preset, in the glass block 21, a marking face M that is opposite to the second end face 211 and that is at a distance from the second end face 211, as shown in FIG. 12 that is a schematic diagram of the glass block 21, where an area between the marking face M and the second end face 211 is a positioning area N, and after etching, by using a laser, the some of the waveguides 22 to a location of the marking face M, adjust a laser parameter used for etching the some of the waveguides 22, and then continuing to etch the positioning area N, so that the positioning area N has an etching rate different from an etching rate at locations of the waveguides 22; and immerse the etched glass block 21 in an acid solution for about five minutes, where etched glass in the immersed positioning area N is corroded away to form a coupling hole 221 recessed from the second end face 211.

Step S3: Connect the second end face 211 of the optical write waveguide block 20 to the first end face 141 of the optical fiber component 10, where the plug ends 121 are inserted into the coupling holes 221 in a one-to-one correspondence manner.

The method further includes: bonding and fixing the first end face 141 and the second end face 211 together by using glue.

In the method for producing an optical coupling apparatus, ends of the optical fibers 12 are directly used as the plug ends 121, and the coupling holes 221 are formed in the glass block 21 when the waveguides 22 are formed. The production is simple, thereby greatly simplifying a production process. In addition, the optical fiber component 10 and the optical write waveguide block 20 can be coupled when the plug ends 121 are plugged into the coupling holes 221, thereby improving coupling precision, and avoiding shifting of the optical fiber component 10 and the optical write waveguide block 20 during subsequent packaging due to unstable bonding resulting from glue or a process. Furthermore, installation of a coupling adapter apparatus is avoided, thereby reducing a coupling loss and costs.

Figure 13:
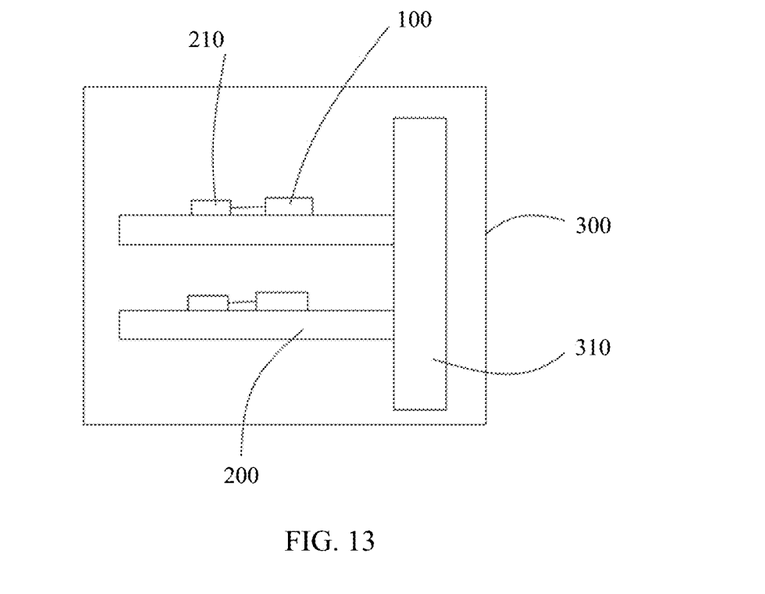
FIG. 13 is a schematic diagram of an implementation of a communications device according to an embodiment of this application.

FIG. 13 shows a communications device according to an embodiment of this application. The communications device includes a circuit board (not shown in the figure) and an optical module 100 disposed on the circuit board. The optical chip 30 is electrically connected to the circuit board. A quantity of the optical modules 100 is not limited to one. The communications device may be a router, an optical backplane, or a cabinet. In this embodiment, an optical backplane is used as an example, including a chassis 300, a backplane 310, and a board 200. An electrical signal processing unit 210 is disposed on the board 200. Functions of an optical module are to convert an electrical signal from the electrical signal processing unit 210 into an optical signal, and transport the optical signal to another board or subrack by using a high-density coupling apparatus, and also to convert an optical signal input from another board or subrack into an electrical signal, and transport the electrical signal to the electrical signal processing unit 210. By using the optical module 100, the communications device implements large-capacity signal transmission and ensures coupling efficiency.

The foregoing descriptions are merely example implementations in accordance with present disclosure. It should be noted that a person of ordinary skill in the art may make several improvements or polishing without departing from the principle of this application and the improvements or polishing shall fall within the protection scope of this application.

What is claimed is:

1. An optical coupling apparatus, comprising:
   an optical fiber component, comprising a plurality of optical fibers and an optical fiber fixing block, wherein the plurality of optical fibers are fixed to the optical fiber fixing block, a first end face is disposed on the optical fiber fixing block, at least some of the optical fibers comprise plug ends, and the plug ends protrude from the first end face; and
   an optical write waveguide block, comprising a main body and a plurality of waveguides corresponding to fiber cores of the plurality of optical fibers, wherein the plurality of waveguides are disposed in the main body, a second end face is disposed on the main body, coupling holes that are in a one-to-one correspondence with the plug ends are disposed on the second end face in a recessed manner, and the coupling holes are formed when ends of the waveguides are recessed from the second end face; and when the second end face and the first end face are connected to each other, the plug ends of the at least some of the optical fibers are inserted into the coupling holes in a one-to-one correspondence manner;

wherein ends of optical fibers in the plurality of optical fibers other than the optical fibers disposed with the plug ends are flush with the first end face, and ends of waveguides in the plurality of waveguides other than waveguides disposed with a coupling hole are flush with the second end face.

2. The optical coupling apparatus according to claim 1, wherein an aperture of an end that is of the coupling hole and that is located on the second end face is greater than an aperture of an end that is of the coupling hole and that is connected to the waveguide.

3. The optical coupling apparatus according to claim 1, wherein a mode field diameter of a side that is of the waveguide in the optical write waveguide block and that is configured to be coupled to the optical fiber is equal to a mode field diameter of the optical fiber.

4. The optical coupling apparatus according to claim 1, wherein the some optical fibers that are in the plurality of optical fibers and that comprise the plug ends are first optical fibers, other optical fibers are second optical fibers, and the first optical fibers are distributed on a periphery of the second optical fibers, or the first optical fibers are distributed among the second optical fibers, or the first optical fibers are distributed on two opposite sides of the second optical fibers.

5. The optical coupling apparatus according to claim 1, wherein a length that is of the plug end and that protrudes from the first end face is less than 1 millimeter.

6. The optical coupling apparatus according to claim 1, wherein a quantity of waveguides forming one coupling hole is the same as a quantity of fiber cores of the optical fiber inserted into the coupling hole.

7. The optical coupling apparatus according to claim 6, wherein the plurality of optical fibers are single-core optical fibers, multi-core optical fibers, or a combination of single-core optical fibers and multi-core optical fibers.

8. The optical coupling apparatus according to claim 7, wherein the plurality of optical fibers are arranged in a two-dimensional array in the optical fiber fixing block.

9. The optical coupling apparatus according to claim 1, wherein the optical fiber component and the optical write waveguide block are fixed through bonding between the second end face and the first end face.

10. An optical module, wherein the optical module comprises an optical chip and optical coupling apparatus according to claim 1.

11. The optical module according to claim 10, wherein the main body of the optical write waveguide block comprises a coupling face, the coupling face is disposed opposite to ends that are of the waveguides and that are located on the second end face, and the coupling face bonds with the optical chip to implement coupling between the optical chip and the optical write waveguide block.

12. The optical module according to claim 10, wherein an aperture of an end that is of the coupling hole and that is located on the second end face is greater than an aperture of an end that is of the coupling hole and that is connected to the waveguide.

13. The optical module according to claim 10, wherein a mode field diameter of a side that is of the waveguide in the optical write waveguide block and that is configured to be coupled to the optical chip is equal to an out-light mode field diameter of the optical chip.

14. The optical module according to claim 10, wherein the optical chip and the optical write waveguide block are coupled in one or more of the following manners: edge coupling, evanescent wave coupling, grating coupling, laser coupling, and sounding array coupling.

15. The optical module according to claim 10, wherein ends that are of the plurality of waveguides in the optical write waveguide block and that are located on the coupling face are arranged in a linear or two-dimensional manner, and a diameter of the waveguide decreases gradually in a direction from the second end face to the coupling face.

16. An optical coupling apparatus, comprising:
an optical fiber component, comprising a plurality of optical fibers and an optical fiber fixing block, wherein the plurality of optical fibers are fixed to the optical fiber fixing block, a first end face is disposed on the optical fiber fixing block, at least some of the optical fibers comprise plug ends, and the plug ends protrude from the first end face; and
an optical write waveguide block, comprising a main body and a plurality of waveguides corresponding to fiber cores of the plurality of optical fibers, wherein the plurality of waveguides are disposed in the main body, a second end face is disposed on the main body, coupling holes that are in a one-to-one correspondence with the plug ends are disposed on the second end face in a recessed manner, and the coupling holes are formed when ends of the waveguides are recessed from the second end face; and
when the second end face and the first end face are connected to each other, the plug ends of the at least some of the optical fibers are inserted into the coupling holes in a one-to-one correspondence manner;
wherein a mode field diameter of a side that is of the waveguide in the optical write waveguide block and that is configured to be coupled to the optical fiber is equal to a mode field diameter of the optical fiber.

17. An optical coupling apparatus, comprising:
an optical fiber component, comprising a plurality of optical fibers and an optical fiber fixing block, wherein the plurality of optical fibers are fixed to the optical fiber fixing block, a first end face is disposed on the optical fiber fixing block, at least some of the optical fibers comprise plug ends, and the plug ends protrude from the first end face; and
an optical write waveguide block, comprising a main body and a plurality of waveguides corresponding to fiber cores of the plurality of optical fibers, wherein the plurality of waveguides are disposed in the main body, a second end face is disposed on the main body, coupling holes that are in a one-to-one correspondence with the plug ends are disposed on the second end face in a recessed manner, and the coupling holes are formed when ends of the waveguides are recessed from the second end face; and
when the second end face and the first end face are connected to each other, the plug ends of the at least some of the optical fibers are inserted into the coupling holes in a one-to-one correspondence manner;

wherein a length that is of the plug end and that protrudes from the first end face is less than 1 millimeter.

18. An optical coupling apparatus, comprising:
an optical fiber component, comprising a plurality of optical fibers and an optical fiber fixing block, wherein the plurality of optical fibers are fixed to the optical fiber fixing block, a first end face is disposed on the optical fiber fixing block, at least some of the optical fibers comprise plug ends, and the plug ends protrude from the first end face; and
an optical write waveguide block, comprising a main body and a plurality of waveguides corresponding to fiber cores of the plurality of optical fibers, wherein the plurality of waveguides are disposed in the main body, a second end face is disposed on the main body, coupling holes that are in a one-to-one correspondence with the plug ends are disposed on the second end face in a recessed manner, and the coupling holes are formed when ends of the waveguides are recessed from the second end face; and
when the second end face and the first end face are connected to each other, the plug ends of the at least some of the optical fibers are inserted into the coupling holes in a one-to-one correspondence manner;
wherein a quantity of waveguides forming one coupling hole is the same as a quantity of fiber cores of the optical fiber inserted into the coupling hole;
wherein the plurality of optical fibers are single-core optical fibers, multi-core optical fibers, or a combination of single-core optical fibers and multi-core optical fibers; and
wherein the plurality of optical fibers are arranged in a two-dimensional array in the optical fiber fixing block.

19. An optical module, wherein the optical module comprises an optical chip and an optical coupling apparatus, wherein the optical coupling apparatus comprising:
an optical fiber component, comprising a plurality of optical fibers and an optical fiber fixing block, wherein the plurality of optical fibers are fixed to the optical fiber fixing block, a first end face is disposed on the optical fiber fixing block, at least some of the optical fibers comprise plug ends, and the plug ends protrude from the first end face; and
an optical write waveguide block, comprising a main body and a plurality of waveguides corresponding to fiber cores of the plurality of optical fibers, wherein the plurality of waveguides are disposed in the main body, a second end face is disposed on the main body, coupling holes that are in a one-to-one correspondence with the plug ends are disposed on the second end face in a recessed manner, and the coupling holes are formed when ends of the waveguides are recessed from the second end face; and
when the second end face and the first end face are connected to each other, the plug ends of the at least some of the optical fibers are inserted into the coupling holes in a one-to-one correspondence manner;
wherein a mode field diameter of a side that is of the waveguide in the optical write waveguide block and that is configured to be coupled to the optical chip is equal to an out-light mode field diameter of the optical chip.

20. An optical module, wherein the optical module comprises an optical chip and an optical coupling apparatus, wherein the optical coupling apparatus comprising:
an optical fiber component, comprising a plurality of optical fibers and an optical fiber fixing block, wherein the plurality of optical fibers are fixed to the optical fiber fixing block, a first end face is disposed on the optical fiber fixing block, at least some of the optical fibers comprise plug ends, and the plug ends protrude from the first end face; and
an optical write waveguide block, comprising a main body and a plurality of waveguides corresponding to fiber cores of the plurality of optical fibers, wherein the plurality of waveguides are disposed in the main body, a second end face is disposed on the main body, coupling holes that are in a one-to-one correspondence with the plug ends are disposed on the second end face in a recessed manner, and the coupling holes are formed when ends of the waveguides are recessed from the second end face; and
when the second end face and the first end face are connected to each other, the plug ends of the at least some of the optical fibers are inserted into the coupling holes in a one-to-one correspondence manner;
wherein ends that are of the plurality of waveguides in the optical write waveguide block and that are located on the coupling face are arranged in a linear or two-dimensional manner, and a diameter of the waveguide decreases gradually in a direction from the second end face to the coupling face.

* * * * *